(12) United States Patent
Terwilliger

(10) Patent No.: US 12,264,609 B2
(45) Date of Patent: Apr. 1, 2025

(54) PARTIAL EXHAUST GAS AUGMENTED CONDENSATION

(71) Applicant: RTX CORPORATION, Farmington, CT (US)

(72) Inventor: Neil J. Terwilliger, Cheshire, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/457,486

(22) Filed: Aug. 29, 2023

(65) Prior Publication Data

US 2025/0075649 A1 Mar. 6, 2025

(51) Int. Cl.
 *F01N 3/18* (2006.01)
 *F01N 3/24* (2006.01)
 *F02C 7/143* (2006.01)

(52) U.S. Cl.
 CPC ............... *F01N 3/18* (2013.01); *F01N 3/24* (2013.01); *F02C 7/143* (2013.01); *F05D 2270/08* (2013.01)

(58) Field of Classification Search
 CPC .. F02C 3/22; F02C 7/143; F02C 3/305; F02C 7/224; F02C 7/141; F02C 7/16; F02C 9/40; F02C 7/12; F02C 3/04; F02C 7/32; F02C 6/20; F02C 3/06; F02C 3/10; F02C 7/1435; F02C 7/185; F02C 7/22; F02C 3/30; F02C 7/36; F02K 3/06; F05D 2260/213; F05D 2260/211; F05D 2220/62; F05D 2220/60; F05D 2260/205; F05D 2260/207; F05D 2220/323; F05D 2260/212; F05D 2220/72; F05D 2260/2322; F05D 2210/14; F05D 2220/76
 See application file for complete search history.

(56) References Cited

U.S. PATENT DOCUMENTS

| | | | |
|---|---|---|---|
| 4,248,039 A | 2/1981 | Cheng | |
| 8,707,701 B2 | 4/2014 | Burkhart | |
| 11,920,526 B1 * | 3/2024 | Terwilliger | F02C 7/185 |
| 2007/0214766 A1 | 9/2007 | Obana et al. | |
| 2012/0111001 A1 | 5/2012 | Espinosa | |
| 2018/0371954 A1 | 12/2018 | Copeland et al. | |
| 2021/0207500 A1 | 7/2021 | Klingels et al. | |
| 2023/0407768 A1 * | 12/2023 | Staubach | F02K 3/06 |
| 2024/0102416 A1 * | 3/2024 | Lei Ma | F01D 25/32 |

OTHER PUBLICATIONS

Extended European Search Report for European Application No. 24197394.0 mailed Feb. 4, 2025.

* cited by examiner

*Primary Examiner* — Anthony Ayala Delgado
(74) *Attorney, Agent, or Firm* — Carlson, Gaskey & Olds, P.C.

(57) ABSTRACT

A turbine engine assembly generates an exhaust gas flow that is communicated through a core flow path. The exhaust gas flow is split into a first exhaust gas flow and a second exhaust gas flow. Water from the second exhaust gas flow is condensed and extracted by a condenser. The extracted water is transformed into a steam flow within an evaporator system utilizing thermal energy from at least the second exhaust gas flow.

18 Claims, 3 Drawing Sheets

PARTIAL EXHAUST GAS AUGMENTED CONDENSATION

TECHNICAL FIELD

The present disclosure relates generally to an aircraft propulsion system that includes a steam generation system transforming water extracted from an exhaust gas flow into steam for injected into a core flow.

BACKGROUND

Reduction and/or elimination of carbon emissions generated by aircraft operation is a stated goal of aircraft manufacturers and airline operators. Turbine engines compress incoming core airflow, mix the compressed airflow with fuel that is ignited in a combustor to generate an exhaust gas flow. Steam injection can provide improved propulsive efficiencies. Water recovered from the exhaust gas flow may be transformed into steam using thermal energy from the exhaust gas flow. Available cold sink temperatures may not be sufficient to efficiently condense water from the entire volume of exhaust gas flow.

SUMMARY

A turbine engine assembly according to an exemplary embodiment of this disclosure includes, among other possible things, a compressor section where an inlet airflow is compressed, a combustor section where the compressed inlet airflow is mixed with fuel and ignited to generate an exhaust gas flow that is communicated through a core flow path, a turbine section through which the exhaust gas flow expands to generate a mechanical power output, the exhaust gas flow is split into a first exhaust gas flow and a second exhaust gas flow. The turbine engine assembly further includes a condenser where water from the second exhaust gas flow is condensed and extracted, and an evaporator system where thermal energy from at least the second exhaust gas flow is utilized to generate a steam flow from at least a portion of water that is extracted by the condenser for injection into a core flow path.

In a further embodiment of the foregoing turbine engine assembly, the second exhaust gas flow is less than or equal to half of a total exhaust gas flow that is generated in the combustor section.

In a further embodiment of any of the foregoing, the turbine engine assembly further includes a heat pump that is in thermal communication with a cold sink flow and the condenser. The heat pump is configured to cool the second exhaust gas flow in the condenser.

In a further embodiment of any of the foregoing, the turbine engine assembly includes an exhaust mixer for merging the first exhaust gas flow and the second exhaust flow downstream from the condenser.

In a further embodiment of any of the foregoing, the turbine engine assembly includes a turboexpander where steam flow generated by the evaporator system is expanded before communication to the combustor section.

In a further embodiment of any of the foregoing turbine engine assemblies, the exit steam flow from the turboexpander is reheated by the exhaust gas flow prior to communication to the combustor section.

In a further embodiment of any of the foregoing, the turbine engine assembly includes a bleed air system where air drawn from the compressor section is used to cool the second exhaust gas flow in the condenser.

In a further embodiment of any of the foregoing turbine engine assemblies, the bleed air system includes a turboexpander through which the bleed air is expanded and cooled before communication to the condenser.

In a further embodiment of any of the foregoing turbine engine assemblies, the bleed air system further includes a heat exchanger for cooling the bleed air.

In a further embodiment of any of the foregoing, the turbine engine assembly further includes a fuel system for communicating a non-carbon based fuel to the combustor section.

An aircraft propulsion system according to another exemplary embodiment of this disclosure includes, among other possible things, a propulsor for generating propulsive thrust, a core engine wherein inlet airflow is compressed, mixed with fuel and ignited to generate an exhaust gas flow that is expanded through a turbine section to generate shaft power that is utilized to drive the propulsor, the exhaust gas flow is split into a first exhaust gas flow and a second exhaust gas flow and the second exhaust gas flow is less than half of the exhaust gas flow, a condenser where water from the second exhaust gas flow is condensed and extracted, an evaporator system where thermal energy from at least the second exhaust gas flow is utilized to generate a steam flow from at least a portion of water that is extracted by the condenser for injection into a core flow path, and a cold sink that is in thermal communication with the second exhaust gas flow in the condenser for cooling the second exhaust gas flow.

In a further embodiment of the foregoing aircraft propulsion system, the cold sink includes a heat pump that is in thermal communication with a cold sink flow and the condenser. The heat pump is configured to cool the second exhaust gas flow in the condenser.

In a further embodiment of any of the foregoing aircraft propulsion systems, the cold sink includes a cooled bleed air system where air drawn from the compressor section is cooled and communicated to the condenser to cool the second exhaust gas flow in the condenser.

In a further embodiment of any of the foregoing aircraft propulsion systems, the bleed air system includes a heat exchanger for cooling the bleed air and a turboexpander through which the bleed air is expanded and cooled before communication to the condenser.

In a further embodiment of any of the foregoing, the aircraft propulsion system includes an exhaust mixer for merging the first exhaust gas flow and the second exhaust flow downstream from the condenser.

In a further embodiment of any of the foregoing, the aircraft propulsion system includes a turboexpander where steam flow generated by the evaporator system is expanded before communication to the core flow path and the exit steam flow from the turboexpander is reheated by the exhaust gas flow prior to communication to the core flow path.

In a further embodiment of any of the foregoing, the aircraft propulsion system further includes a fuel system for communicating a non-carbon based fuel to a combustor section of the core engine.

A method of operating an aircraft propulsion system according to another exemplary embodiment of this disclosure includes, among other possible things, generating an exhaust flow that contains a mixture of steam, compressed air and fuel, splitting the generated exhaust flow into a first exhaust flow and a second exhaust flow with the second exhaust flow being less than half of the total generated exhaust flow, condensing and extracting water from the second exhaust flow, thermally communicating the second exhaust flow with a cold sink in the condenser for cooling the second exhaust flow, generating a steam flow with thermal energy from the generated exhaust flow, and at least portion of the steam flow is injected into a core flow path.

In a further embodiment of the foregoing method, the cold sink includes a heat pump that is in thermal communication with a cold sink flow and the condenser. The heat pump is configured to cool the second exhaust flow in the condenser.

In a further embodiment of any of the foregoing methods, the cold sink includes a cooled bleed air system where air is drawn from the core flow path and communicated to the condenser to cool the second exhaust flow in the condenser.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
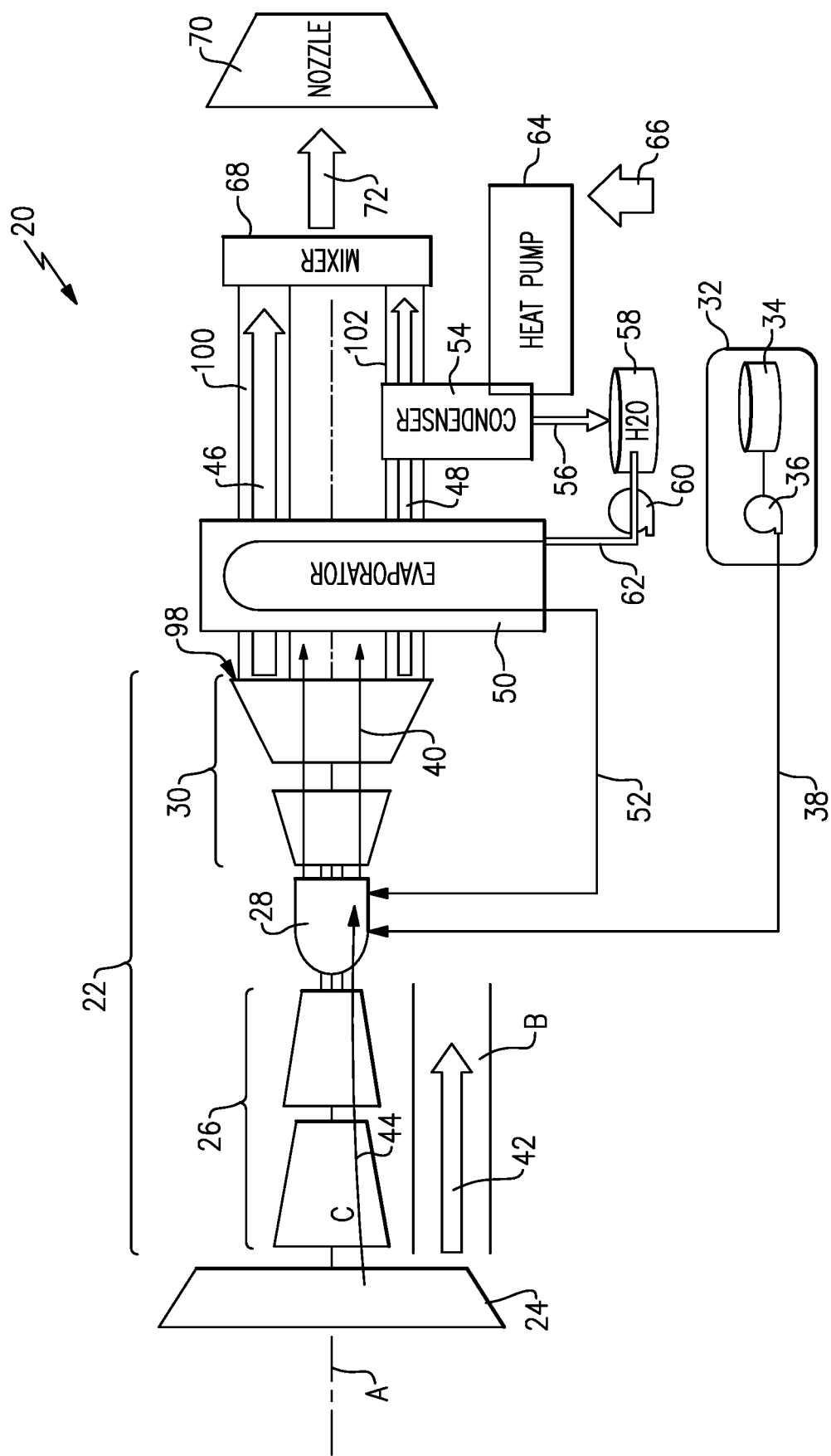
FIG. 1 is a schematic view of an example aircraft propulsion system embodiment.

FIG. 1 schematically illustrates an example propulsion system 20 that condenses and extracts water from a partial portion of the exhaust gas flow to reduce difficulties incurred by attempting to extract water from all of the exhaust gas flow. The example propulsion system further includes additional features that improve cooling of the partial portion of the exhaust gas flow in a condenser system 54.

The example propulsion system 20 includes a fan section 24 and a core engine 22. The core engine 22 includes a compressor section 26, a combustor section 28 and a turbine section 30 disposed along an engine longitudinal axis A. The fan section 24 drives a fan bypass airflow 42 along a bypass flow path B, while the compressor section 26 draws inlet air along a core flow path C as a core flow 44. The core flow 44 is compressed and communicated to the combustor section 28 where a compressed core airflow 44 is mixed with a fuel flow 38 and ignited to generate the exhaust gas flow 40. The exhaust gas flow 40 expands through the turbine section 30 where energy is extracted and utilized to drive the fan section 24 and the compressor section 26.

Although an example engine architecture is disclosed by way of example, other turbine engine architectures are within the contemplation and scope of this disclosure. Moreover, although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

A fuel system 32 including at least a fuel tank 34 and a fuel pump 36 to provide the fuel flow 38 to the combustor 28. The example fuel system 32 is configured to provide a hydrogen based fuel such as a liquid hydrogen ($LH_2$). Although hydrogen is disclosed by way of example, other non-carbon based fuels could be utilized and are within the contemplation of this disclosure. Moreover, the disclosed features may also be beneficial in an engine configured to operate with traditional carbon fuels and/or biofuels, such as sustainable aviation fuel.

An evaporator system 50 and a condenser 54 are disposed downstream of the turbine section 30 and receive portions of the exhaust gas flow 40. The evaporator system 50 utilizes thermal energy from the exhaust gas flow 40 to generate a steam flow 52 from water 56 extracted by the condenser 54. The extracted water 56 is gathered in a tank 58 and pressurized by a pump 60 for communication to the evaporator system 50 as a pressurized water flow 62. In one disclosed example, the bypass airflow 42 is utilized as a cold sink 66 in a heat pump 64 associated with the condenser 54 to cool a portion 48 of the exhaust gas flow.

The steam flow 52 from the evaporator 50 is communicated to the combustor 28 and combined with the core flow 44 to increase mass flow through the turbine section 30 and thereby increase engine power and efficiency. The propulsion system 20 has an increased power output utilizing the injected steam flow 74 due to increased mass flow through the turbine section 30 without a corresponding increase in work from the compressor section 26. Although the example steam flow 74 is shown as injected into the combustor 28, the steam flow 74 may be injected at other locations along the core flow path C and remain with the contemplation of this disclosure. For example, some or all of the steam flow 74 could be injected in an inlet of the propulsion system 20, the compressor section 26, and/or the turbine section 30.

The exhaust gas flow 40 is a mix of steam, and components from combustion of fuel. The components from combustion can include, among other possible components, nitrogen, carbon dioxide and oxygen. These combustion components reduce the efficiency of the condenser 54 in condensing liquid water from the exhaust gas flow 40. Moreover, the bypass airflow 42 has a limited capacity for cooling that may further reduce condenser efficiencies. The example propulsion system provides for increased condenser efficiencies by separating the exhaust gas flow 40 into a first exhaust gas flow 46 communicated through a first passage 100 and a second exhaust gas flow 48 communicated through a second passage 102. Only the second exhaust gas flow 48 is communicated to the condenser 54 for extraction of water.

In one example embodiment, the second exhaust gas flow 48 is equal to or less than half of the total exhaust gas flow 40 emitted from an outlet of the turbine section 30. In another example embodiment, the second exhaust gas flow 48 has a flow volume of between 10% and 25% that of the first exhaust gas flow 46. Additionally, the split between the first exhaust gas flow 46 and the second exhaust gas flow 48 may range from around 90% of the exhaust gas flow 40 communicated through the condenser 54 to as little as about 10% of the total exhaust gas flow 40 communicated through the condenser 54.

In one example embodiment, the water extracted is less than or equal to around 25% of the total core mass flow. In another example embodiment, the water extracted is less than or equal to around 10% of the total core mass flow. Moreover, in another example embodiment, the relatively smaller flow volume of the second exhaust gas flow 48 that is communicated through the condenser 54 allows a lower flow volume of cold sink 66 to condense and extract water.

The example cold sink 66 is associated with a heat pump 64 in thermal communication with the condenser 54. The heat pump 64 provides for movement of thermal energy away from the condenser 54 and to the cold sink 66. The example heat pump 64 may be of any configuration that provides for movement of thermal energy away from the condenser 54. In one example embodiment, the heat pump 54 comprises a refrigerant circuit circulating a refrigerant between the second exhaust gas flow 48 and the cold sink 66.

Because water is extracted from only a portion of the exhaust gas flow 40, the steam content, due to recirculation of steam is maintained relatively low. Accordingly, the partial pressure of steam will be lower and so will the condensation temperature, potentially near or below the temperature of available cooling sinks. Accordingly, the example heat pump 64 provides an increase in the available cold sink 66.

Water extracted from the second exhaust gas flow 48 is pressurized by the pump 60 and communicated as the pressurized flow of water to the evaporator 50. The pressurized water is heated by both the first exhaust gas flow 46 and the second exhaust gas flow 48 to provide the steam flow 52 that is communicated to the combustor 28.

The first and second exhaust gas flows 46 and 48 are recombined into a combined exhaust flow 72 by a mixer 68. The combined exhaust gas flow 72 is exhausted to the ambient environment through a nozzle 70. Although the exhaust gas flow 40 is separated for water extraction, thermal energy from both the first and second exhaust gas flows 46, 48 may be communicated to the evaporator 50. In another example embodiment, thermal energy from only one of the first and second exhaust gas flows 46, 48 is communicated to the evaporator 50.

In one example embodiment, operation of the example propulsion system 20 proceeds in the combustor 28 with the generation of the exhaust gas flow 40. The example exhaust gas flow 40 is a mixture of the products of combustion from the compressed inlet core flow 44, fuel flow 38 and steam 52. The exhaust gas flow 40 expands through the turbine section 30 to generate shaft power utilized to drive the propulsive fan 24 and the compressor section 26, along with other engine accessory components. The exhaust gas flow 40 is split into the first exhaust gas flow 46 and the second exhaust gas flow 48 at the exit 98 of the turbine section 30. Division of the first and second exhaust gas flows 46, 48 may be provided with appropriate ducting or other features of the exhaust ducting that define first and second passages 100, 102. Both the first exhaust gas flow 46 and the second exhaust gas flow 48 communicate thermal energy to the evaporator 50. Only the second exhaust gas flow is communicated to the condenser 54. The condenser 54 is cooled by heat pump 64 and a cold sink flow 66. The cold sink flow 66 may be fan bypass airflow 42 or other cooling flows such as the fuel flow 38 and/or a refrigerant system. The enhanced cooing provided by the heat pump 64 is applied to only the partial portion of the exhaust gas flow 40 defined by the second exhaust gas flow 48 through the second passage 102. The limited amount of exhaust gas flow provides a more favorable application of cooling that improves overall water extraction efficiency. Any overall reduction in water extraction due to removal from only part of the exhaust gas flow is accommodated by targeting use of the extracted water to specific features and functions that provide the most improvement in combustion and engine operating efficiencies.

The first and second exhaust gas flows 46, 48 are recombined in the mixer 68 and exhausted as the combined exhaust gas flow through the nozzle 64.

Figure 2:
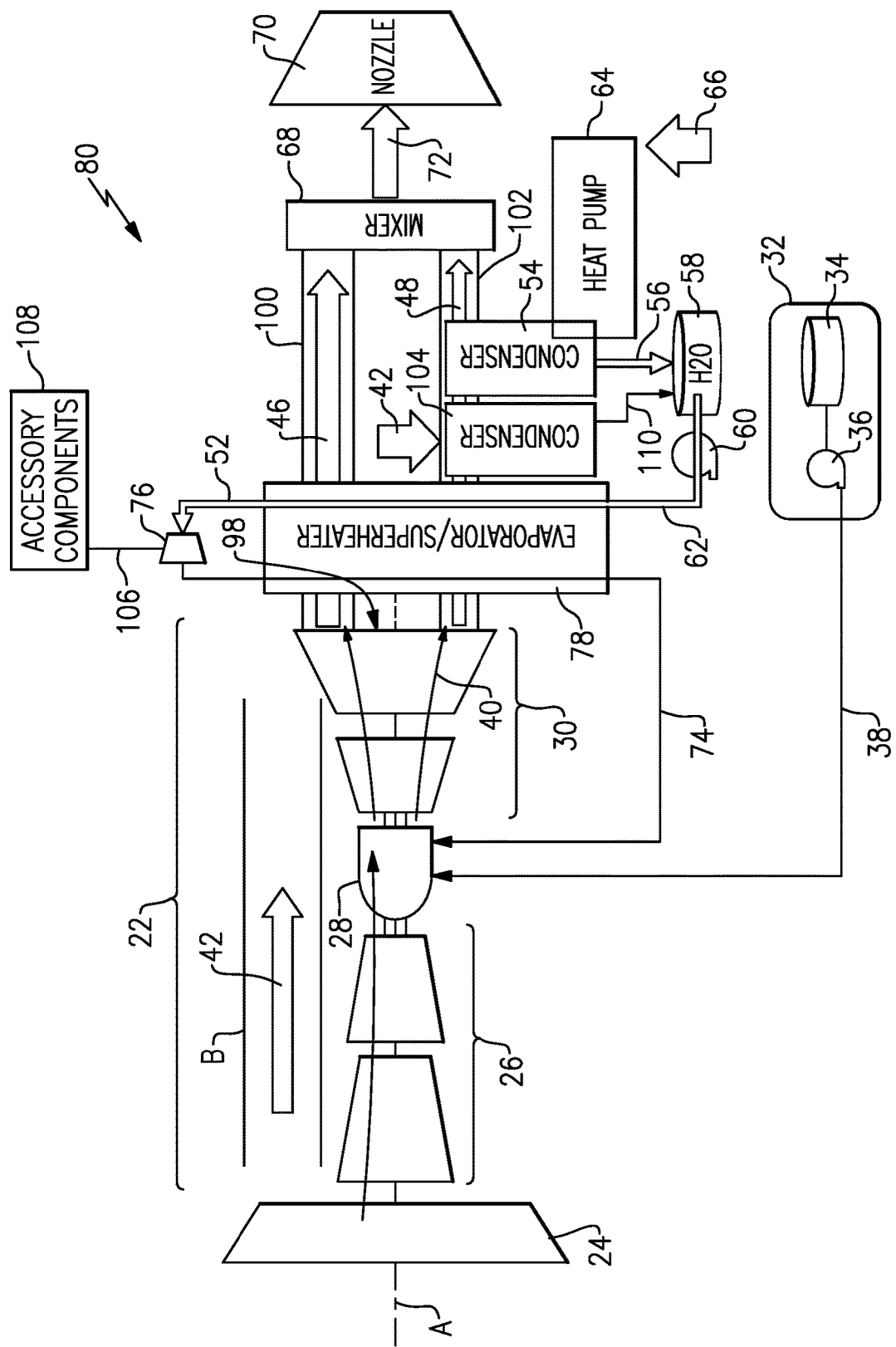
FIG. 2 is a schematic view of another example aircraft propulsion system embodiment.

Referring to FIG. 2, another example propulsion system 80 is schematically shown and includes a steam turbine 76, an evaporator/superheater 78 and an additional condenser 104.

The steam turbine 76 provides shaft power 106 and communicates the expanded steam flow back through an evaporator/super heater 78 to generate a superheated steam flow 74. The initial steam flow 52 is expanded through the steam turbine 76 to generate shaft power 106 that may be utilized to drive accessory components schematically indicated at 108. The accessory components 108 may include, among other possible devices, a pump, generator and/or actuator. Steam exiting the steam turbine 76 may be include both vapor and liquid and is reheated in the evaporator/superheater 78. Although the disclosed example embodiment illustrates the evaporator/superheater 78 as a single device, it may be configured as separate devices to accommodate application specific limitations. Moreover, the evaporator/superheater 78 may be separate parts to enable exposure to different temperatures of the exhaust gas flow 40 to provide the evaporation and superheating functions.

The second condenser 104 provides for an initial condensation and extraction of water as indicated at 110. In this disclosed example, bypass fan airflow 42 is utilized as the cold sink for the second condenser 104. The second exhaust gas flow 48 is initially cooled in the second condenser 104 to provide for the extraction of an initial amount of water as indicated at 110. The cooled second exhaust gas flow 48 from the second condenser 104 is communicated to the condenser 54 for extraction of additional water. The cooler second exhaust gas flow 48 provided to the condenser 54 is further cooled by the heat pump 64 and the cold sink flow 66. The additional condenser 104 provides an additional cooling of the second exhaust gas flow 48 that further improves water extraction efficiency.

Figure 3:
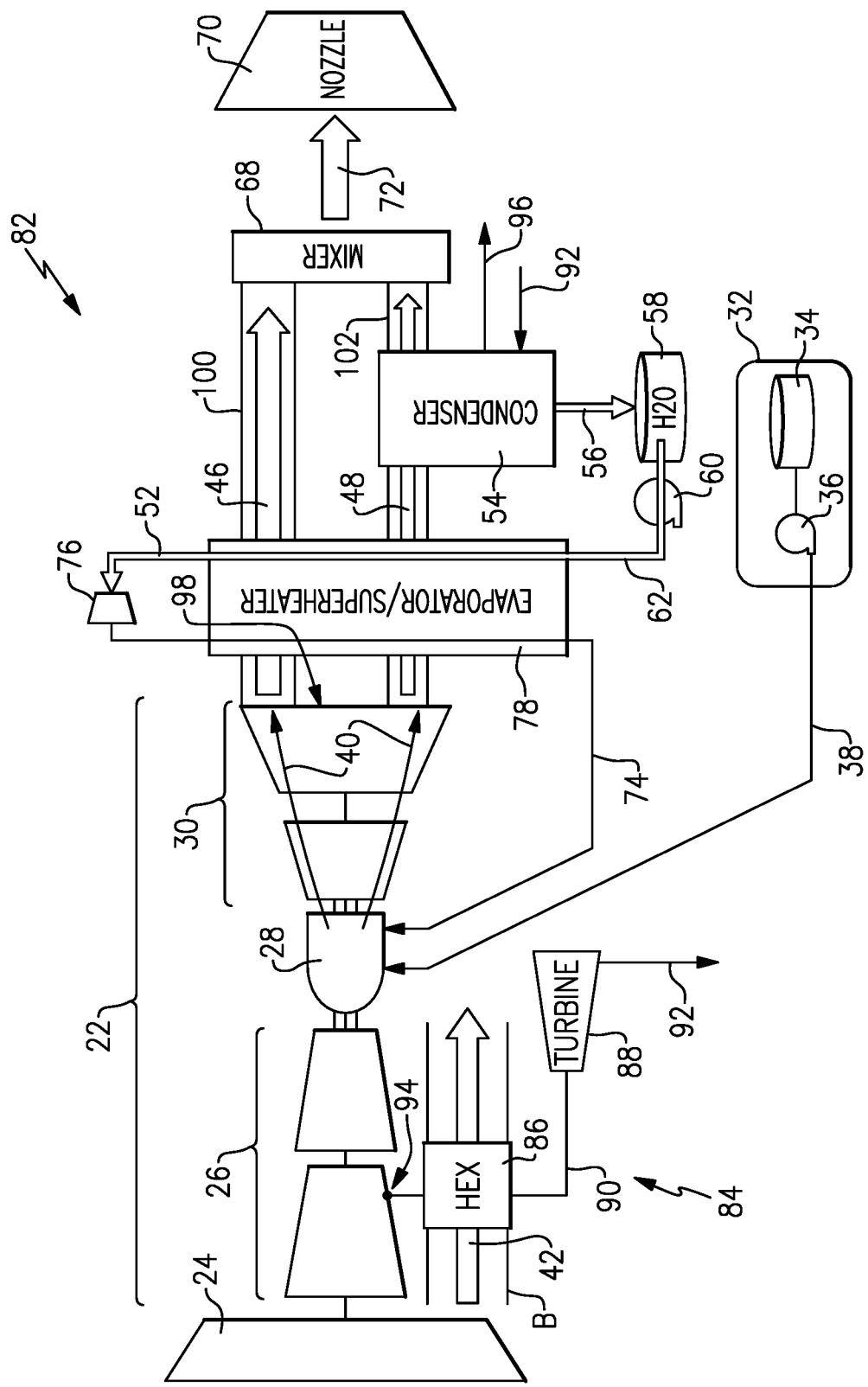
FIG. 3 is a schematic view of still another example aircraft propulsion system embodiment.

Referring to FIG. 3, another example aircraft propulsion system 82 utilizes cooled bleed airflow 92 as a cold sink at the condenser 54. In this disclosed example embodiment, a bleed air system 84 provides a bleed airflow that is extracted from a location 94 within the compressor section 26. The specific location 94 may be located anywhere within the compressor section 26 that is determined to provide bleed airflow at an appropriate temperature and pressure.

In one disclosed example, the bleed airflow 90 is cooled in a heat exchanger 86. The example heat exchanger 86 is in thermal communication with the bypass fan airflow 42 to provide an initial cooling of the bleed airflow 90. The bleed airflow 90 is expanded through a bleed air turbine 88 (e.g., turboexpander) for further cooling. The bleed airflow exhausted from the bleed air turbine 88 is provided as a cooled bleed airflow 92 and is cooled to a temperature less than that of the fan bypass airflow 42 and communicated to the condenser 54. The cooled bleed airflow 92 is placed in thermal communication with only the second exhaust gas flow 48 in the condenser 54 and subsequently exhausted as indicated at 96. The exhausted cooled bleed airflow 96 may be exhausted to the ambient environment or routed to other areas of the propulsion system that require cooling. The combination of the cooled bleed airflow 92 utilized as the cold sink that acts on only a portion of the total exhaust gas flow, improves water extraction efficiency as compared to attempts to cool, condense, and extract water from all of the generated exhaust gas flow.

Accordingly, extraction and cooling of only a partial portion of the exhaust gas flow combined with enhanced cooling provides improved overall propulsion system efficiency.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine assembly comprising:
   a compressor section where an inlet airflow is compressed;
   a combustor section where the compressed inlet airflow is mixed with fuel and ignited to generate an exhaust gas flow that is communicated through a core flow path;
   a turbine section through which the exhaust gas flow expands to generate a mechanical power output, wherein the exhaust gas flow is split into a first exhaust gas flow and a second exhaust gas flow;
   a condenser where water from the second exhaust gas flow is condensed and extracted; and
   an evaporator system where thermal energy from at least the second exhaust gas flow is utilized to generate a steam flow from at least a portion of water extracted by the condenser for injection into a core flow path;
   an exhaust mixer for merging the first exhaust gas flow and the second exhaust flow downstream from the condenser.

2. The turbine engine assembly as recited in claim 1, wherein the second exhaust gas flow is less than or equal to half of a total exhaust gas flow generated in the combustor section.

3. The turbine engine assembly as recited in claim 1, further including a heat pump in thermal communication with a cold sink flow and the condenser, wherein the heat pump is configured to cool the second exhaust gas flow in the condenser.

4. The turbine engine assembly as recited in claim 1, including a steam turbine where steam flow generated by the evaporator system is expanded before communication to the combustor section.

5. A turbine engine assembly comprising:
   a compressor section where an inlet airflow is compressed;
   a combustor section where the compressed inlet airflow is mixed with fuel and ignited to generate an exhaust gas flow that is communicated through a core flow path;
   a turbine section through which the exhaust gas flow expands to generate a mechanical power output, wherein the exhaust gas flow is split into a first exhaust gas flow and a second exhaust gas flow;
   a condenser where water from the second exhaust gas flow is condensed and extracted;
   an evaporator system where thermal energy from at least the second exhaust gas flow is utilized to generate a steam flow from at least a portion of water extracted by the condenser for injection into a core flow path; and
   a steam turbine where steam flow generated by the evaporator system is expanded before communication to the combustor section, wherein an exit steam flow from the steam turbine is reheated by the exhaust gas flow prior to communication to the combustor section.

6. The turbine engine assembly as recited in claim 1, including a bleed air system where air drawn from the compressor section is used to cool the second exhaust gas flow in the condenser.

7. The turbine engine assembly as recited in claim 6, wherein the bleed air system includes a turboexpander through which the bleed air is expanded and cooled before communication to the condenser.

8. The turbine engine assembly as recited in claim 7, wherein the bleed air system further includes a heat exchanger for cooling the bleed air.

9. The turbine engine assembly as recited in claim 1, further including a fuel system for communicating a non-carbon based fuel to the combustor section.

10. An aircraft propulsion system comprising:
    a propulsor for generating propulsive thrust;
    a core engine wherein inlet airflow is compressed, mixed with fuel, and ignited to generate an exhaust gas flow that is expanded through a turbine section to generate shaft power utilized to drive the propulsor, wherein the exhaust gas flow is split into a first exhaust gas flow and a second exhaust gas flow and the second exhaust gas flow is equal to or less than half of the exhaust gas flow;
    a condenser where water from the second exhaust gas flow is condensed and extracted;
    an evaporator system where thermal energy from at least the second exhaust gas flow is utilized to generate a steam flow from at least a portion of water extracted by the condenser for injection into a core flow path; and
    a cold sink in thermal communication with the second exhaust gas flow in the condenser for cooling the second exhaust gas flow; and
    an exhaust mixer for merging the first exhaust gas flow and the second exhaust flow downstream from the condenser.

11. The aircraft propulsion system as recited in claim 10, wherein the cold sink includes a heat pump in thermal communication with a cold sink flow and the condenser, wherein the heat pump is configured to cool the second exhaust gas flow in the condenser.

12. The aircraft propulsion system as recited in claim 10, wherein the cold sink comprises a cooled bleed air system where air drawn from the compressor section cooled and communicated to the condenser to cool the second exhaust gas flow in the condenser.

13. An aircraft propulsion system comprising:
    a propulsor for generating propulsive thrust;
    a core engine wherein inlet airflow is compressed, mixed with fuel, and ignited to generate an exhaust gas flow that is expanded through a turbine section to generate shaft power utilized to drive the propulsor, wherein the exhaust gas flow is split into a first exhaust gas flow and a second exhaust gas flow and the second exhaust gas flow is equal to or less than half of the exhaust gas flow;
    a condenser where water from the second exhaust gas flow is condensed and extracted;
    an evaporator system where thermal energy from at least the second exhaust gas flow is utilized to generate a steam flow from at least a portion of water extracted by the condenser for injection into a core flow path;
    a cold sink in thermal communication with the second exhaust gas flow in the condenser for cooling the second exhaust gas flow, wherein the cold sink comprises a cooled bleed air system where air drawn from the compressor section cooled and communicated to the condenser to cool the second exhaust gas flow in the condenser and the bleed air system includes a heat exchanger for cooling the bleed air and a turboexpander through which the bleed air is expanded and cooled before communication to the condenser.

14. The aircraft propulsion system as recited in claim 10, including a steam turbine where steam flow generated by the evaporator system is expanded before communication to the core flow path and the exit steam flow from the steam turbine is reheated by the exhaust gas flow prior to communication to the core flow path.

15. The aircraft propulsion system as recited in claim 10, further including a fuel system for communicating a non-carbon based fuel to a combustor section of the core engine.

16. A method of operating an aircraft propulsion system comprising:
   generating an exhaust flow containing a mixture of steam, compressed air, and fuel;
   splitting the generated exhaust flow into a first exhaust flow and a second exhaust flow with the second exhaust flow being less than half of the total generated exhaust flow;
   condensing and extracting water from the second exhaust flow;
   thermally communicating the second exhaust flow with a cold sink in the condenser for cooling the second exhaust flow;
   generating a steam flow with thermal energy from the generated exhaust flow; and
   injecting at least portion of the steam flow into a core flow path; and
   mixing the first exhaust flow and the second exhaust flow in an exhaust mixer downstream from the condenser.

17. The method as recited in claim 16, wherein the cold sink includes a heat pump in thermal communication with a cold sink flow and the condenser, wherein the heat pump is configured to cool the second exhaust flow in the condenser.

18. The method as recited in claim 16, wherein the cold sink comprises a cooled bleed air system where air drawn from the core flow path and communicated to the condenser to cool the second exhaust flow in the condenser.

* * * * *